United States Patent
Guo et al.

(10) Patent No.: US 9,053,166 B2
(45) Date of Patent: *Jun. 9, 2015

(54) DYNAMICALLY VARYING THE NUMBER OF DATABASE REPLICAS

(71) Applicant: Microsoft Corporation, Redmond, WA (US)

(72) Inventors: Qun Guo, Bellevue, WA (US); Pradeep Mani, Bellevue, WA (US); Ajay Kalhan, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 252 days.

This patent is subject to a terminal disclaimer.

(21) Appl. No.: 13/710,349

(22) Filed: Dec. 10, 2012

(65) Prior Publication Data

US 2014/0164329 A1 Jun. 12, 2014

(51) Int. Cl.
*G06F 7/00* (2006.01)
*G06F 17/00* (2006.01)
*G06F 17/30* (2006.01)

(52) U.S. Cl.
CPC .............................. *G06F 17/30584* (2013.01)

(58) Field of Classification Search
CPC .................. G06F 17/39584; G06F 17/30575; G06F 17/30902
USPC .................. 707/639, 740, 899; 709/202, 223; 705/219, 223, 323; 715/716; 717/136
See application file for complete search history.

(56) References Cited

U.S. PATENT DOCUMENTS

| | | | |
|---|---|---|---|
| 6,463,454 B1 * | 10/2002 | Lumelsky et al. | 718/105 |
| 8,368,540 B2 * | 2/2013 | Perkins et al. | 340/572.1 |
| 8,392,482 B1 * | 3/2013 | McAlister et al. | 707/899 |
| 2003/0126202 A1 * | 7/2003 | Watt | 709/203 |
| 2005/0154697 A1 * | 7/2005 | Altaf et al. | 707/1 |
| 2007/0250608 A1 * | 10/2007 | Watt | 709/222 |
| 2011/0178985 A1 | 7/2011 | San Martin Arribas et al. | |
| 2011/0225122 A1 * | 9/2011 | Denuit et al. | 707/634 |
| 2012/0047392 A1 | 2/2012 | Akrav et al. | |
| 2014/0101100 A1 * | 4/2014 | Hu et al. | 707/617 |

OTHER PUBLICATIONS

Bonvin, Nicolas et al., "Business Continuity in Windows Azure SQL Database," (retrieved from: http://msdn.microsoft.com/en-us/library/windowsazure/hh852669.aspx on Sep. 16, 2002), (date unknown), (13 pages).

Chun, Byung-Gon, et al, "Efficient Replica Maintenance for Distributed Storage Systems," In 3rd conference on Networked Systems Design & Implementation—vol. 3, May 8, 2006, (14 pages).

(Continued)

*Primary Examiner* — Susan Chen
(74) *Attorney, Agent, or Firm* — Aneesh Mehta; Kate Drakos; Micky Minhas

(57) ABSTRACT

Embodiments of the invention dynamically vary the number of replicas based on certain conditions to protect users from data loss. The size of the database is one condition that can be used to determine the number of replicas required. A database system may create three replicas. When the database size exceeds a first threshold, a fourth replica may be created. The fourth replica is maintained as long as the database size is above a second threshold that is smaller than the first threshold. However, when the database shrinks below the second threshold, then the fourth replica is deleted. Using two different thresholds in this manner prevents the system from frequently cycling between three and four replicas.

13 Claims, 4 Drawing Sheets

(56) References Cited

OTHER PUBLICATIONS

Mukerjee, Kunal, et al., "SQL Azure as a Self-Managing Database Service: Lessons Learned and Challenges Ahead," Bulletin of the IEEE Computer Society Technical Committee on Data Engineering, vol. 34, No. 4, Dec. 2011, (10 pages).

Ganesh, Lakshmi, "Dynamic Cost-Efficient Replication in Data Clouds," in 1st workshop on Automated control for datacenters and clouds, Jun. 15, 2009, (122 pages).

Bonvin, Nicolas, et al., "Dynamic Cost-Efficient Replication in Data Clouds," in 1st workshop on Automated control for datacenters and clouds, Jun. 15, 2009, (8 pages).

* cited by examiner

DYNAMICALLY VARYING THE NUMBER OF DATABASE REPLICAS

BACKGROUND

Large scale data centers typically comprise organized clusters of hardware running collections of standard software packages, such as web servers, database servers, and the like. Distributed computing services may be provided using devices on a network comprising multiple interconnected data centers. Database replication services allow a service provider to maintain one or more backup copies of their data at multiple locations on the network. Existing data backup solutions enable a user to store backup information in a location and/or on media that are separate from an original source. Data from one machine may be backed-up or replicated to separate databases at remote network locations. This replicated data can be retrieved to restore a database or service in the event of a failed machine.

In a cloud computing environment, for example, a service may use a predetermined number of replicas for all databases, such as a primary replica and one or more secondary replicas. Each database replica is maintained on a separate machine, which is often located remote from machines hosting other replicas of the same data. When a machine fails and does not come back online for a considerable amount of time, such as two hours, the replica stored on the failed machine will be lost and must be rebuilt. The larger the amount of data that is lost, the more time it will take to rebuild the lost replica. During the time it takes to rebuild the lost replica, there are only two replicas available. This further increases the risk of data loss if the primary replica or a secondary replica fails while the lost replica is being replaced.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention dynamically vary the number of replicas based on certain conditions to protect users from data loss. The size of the database is one condition that can be used to determine the number of replicas required.

Typically, a database system may create three replicas—such as a primary replica and two secondary replicas. When the database size exceeds a first threshold, a fourth replica may be created. The fourth replica is maintained as long as the database size is above a second threshold that is smaller than the first threshold. However, when the database shrinks below the second threshold, then the fourth replica is deleted. Using two different thresholds in this manner prevents the system from frequently cycling between three and four replicas.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
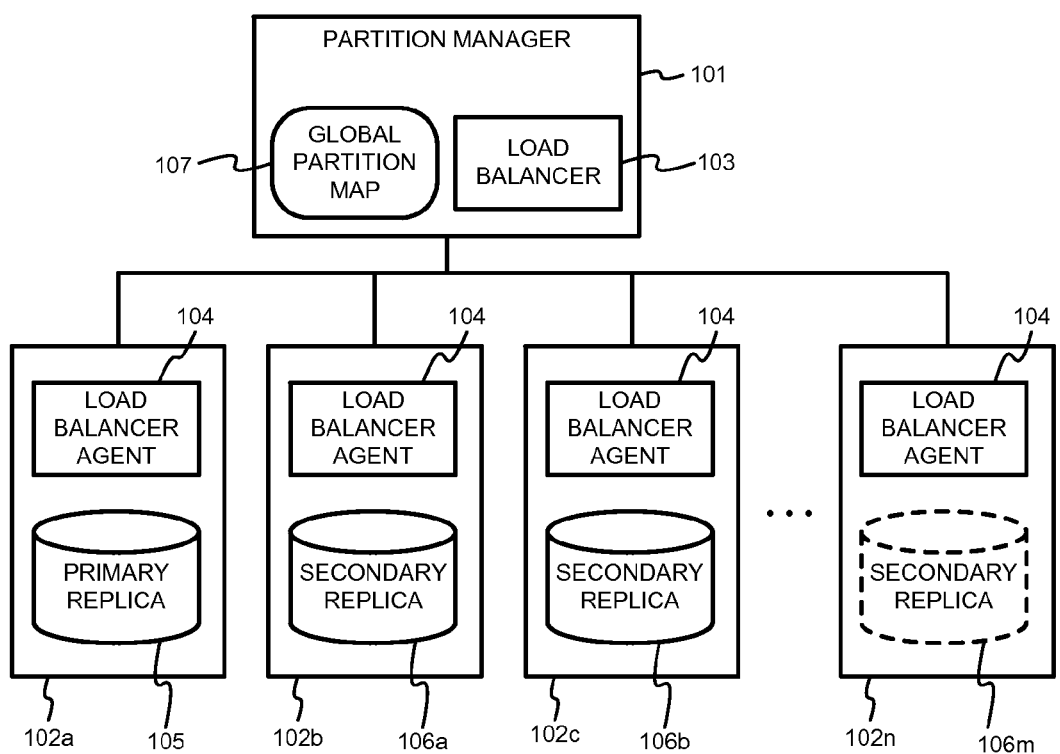
FIG. 1 illustrates a system for maintaining a variable number of database replicas according to one embodiment.

Mathematical analysis of database storage systems by the inventors has shown that using a fixed number of database replicas or backups will result in higher risk of data loss as the size of the database increases. To address this issue, the inventors have introduced a concept of dynamically varying the number of replicas based on the size of original database. For example, if a distributed or cloud storage system currently uses three replicas for each customer database (e.g., an original and two secondaries), then the risk of data loss significantly increases when the customer database grows beyond a certain threshold. To protect against data loss in this situation, an additional replica (e.g., a fourth replica) of the database is created when the database grows above a defined size.

The number of replicas required is determined based upon the actual size of the database and does not depend upon a maximum or potential size of the database. Logic in the database system monitors the actual size of the database and determines when a new replica should be created.

For example, in a database system in which three replicas are normally generated, the logic will determine when a fourth database replica should be created. Two database-size thresholds are specified in the logic: a hard threshold, and a soft threshold. These thresholds are used to determine how many active replicas should exist based on the current size of the database.

The hard threshold is the database size that is used to determine when the next replica should be created. For example, if the system uses three databases as a default configuration, when the database size exceeds the hard threshold then a fourth replica will be created for the database.

The soft threshold is smaller than the hard threshold and is used to determine when to drop one of the replicas and to use a small number of replicas. The soft threshold is set to account for oscillations in database size. The database size will typically fluctuate during normal operations due to inserts and deletes. The soft threshold provides an allowed range below the hard threshold that prevents frequent cycling between creating new replicas and dropping extra replicas of the same database.

Once the database grows beyond the hard threshold and a new replica is added, the new replica will be maintained even if the database size drops back below the hard threshold. However, once the database shrinks below the soft threshold, then the extra replica may be dropped. This prevents frequent cycling in the number of active replicas. For example—in the situation where three replicas are typically used—if the soft threshold for a database is 75 GB and hard threshold is 100 GB, then a fourth replica database is enabled when the database size reaches 100 GB. The fourth replica will be maintained even if the database size drops below 100 GB; however, when the size of the database drops below 75 GB, then the number of required replicas will be reduced back to three and the fourth replica will be dropped.

FIG. 1 illustrates a system for maintaining a variable number of database replicas according to one embodiment. A partition manager controls and monitors database replicas across a number of machines 102a-n. Partition manager 101 hosts a load balancer 103 that monitors the size of each database using a load balancer agent 104 on each machine 102a-n. Periodically, such as every thirty minutes, for example, statistics for each database are uploaded from the load balancer agent 104 on each machine 102 to the load balancer 103. This gives load balancer 103 and partition manager 101 current knowledge of the database size.

Partition Manager 101 is a central manager that ensures databases are available and have sufficient redundancy. For example, when a customer loads a database on the system, a primary replica 105 of the database will be created. Partition manager 101 determines whether secondary replicas 106a-m m be created and, if so, the number of secondary replicas required. Partition manager 101 can dynamically vary the number of replicas on machines 102 based on certain conditions to shield the database owner from data loss. These conditions include, for example, the current database size or the number/frequency of database transactions.

The partition manager assigns a replication factor to each database. The replication factor is the target number of replicas for the database. The partition manager 101 attempts to keep a database at its target replication factor in response to different types of failures, such as transient or permanent failures of machines 102. When an existing replica (105, 106a-m) is permanently lost or is unavailable for a predetermined duration, then partition manager 101 will perform a replacement replica build to create a replacement replica for that database. During a replacement replica build, the partition manager prioritizes rebuilding the third replica over the fourth replica when there is a contention for resources.

The partition manager 101 maintains a global partition map (GPM) 107 to track the replicas 105, 106a-m for each database. Each machine may also use a local partition map (LPM) to track the state of replicas on a particular machine or node. The LPM may report on the progress of operations involving any of the replicas.

In one embodiment, partition manager 101 is an event-driven state machine processor. The events may be, for example, messages from other nodes in the cluster or state changes in the database. The messages may include indicates that a node or replica status (e.g., NodeDown, NodeUp, ReplicaUp, etc.). The partition manager 101 may include background threads that periodically check for state changes in the database and determine if work needs to be done. An example class of state change is timers that are stored in the database. These timers may be used to implement a timeout for replacement replica build, for keeping track of duration that a node is down, and/or for timing other events.

In one embodiment, the following configuration settings are maintained by the partition manger 101 or global partition map 107:

FunctionalityEnabled—indicates whether variable numbers of replicas will be used.

SizeThresholdHard—when a database crosses this threshold, the partition manager 101 will increase the replication factor for the database.

SizeThresholdSoft—when a database drop below this threshold, the partition manager 101 will decrease the replication factor for the database.

DatabaseIsLarge—indicates that the database has exceeded the Size Threshold Hard value and an additional replica is required.

RequiredReplicaCount—indicates the current number of database replicas required.

The DatabaseIsLarge value may be a binary value or flag that set or cleared based upon information from load balancer 103 and load balancer agents 104. When the load balancer indicates that the page counts of partition exceeds SizeThresholdHard or falls below SizeThresholdSoft.

The RequiredReplicaCount value is increased when DatabaseIsLarge is true and the database does not already have more than the required number of replica. In the situation where a user has already elected to create a higher number replicas, such as for critical data, then the number of replicas may already be at the RequiredReplicaCount value when DatabaseIsLarge becomes true.

When DatabaseIsLarge is changed it implies a RequiredReplicaCount change and the partition manager 101 processes the database to add/drop the additional replica as needed.

Figure 2:
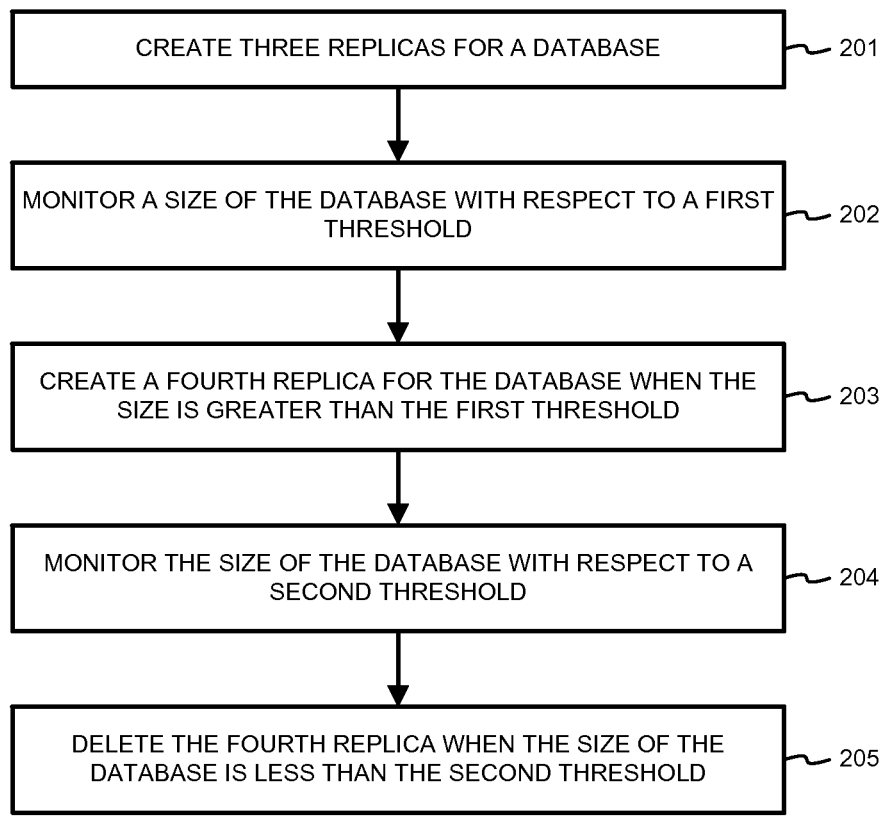
FIG. 2 is a flowchart illustrating a method or process for managing the number of replicas created for a database based upon database size.

FIG. 2 is a flowchart illustrating a method or process for managing the number of replicas created for a database based upon database size. In step 201, three replicas are created for a database. In step 202, the size of the database is monitored with respect to a first threshold. When the database size is greater than the first threshold, a fourth replica for the database is created in step 203. The replicas may be created on separate nodes or machines.

In step 204, the size of the database is monitored with respect to a second threshold. In step 205, the fourth replica is deleted when the size of the database is less than the second threshold. One of the replicas may be designated as a primary replica and the other replicas as secondary replicas. A partition manager may control the creation and deletion of the fourth replica based upon information from a load balancer agent that monitors the database.

Quorum can be achieved even with four replicas (i.e., despite having an even number of replicas). For example, if one of the replicas fails, the configuration can be reduced to three replicas to provide a quorum.

In FIG. 2, the system starts with a set number of replica (e.g., three replica) and one more replica is added or deleted when an expansion (i.e. hard) threshold or contraction (i.e., soft) threshold is passed. In other embodiments, multiple expansion and contraction thresholds may be used and each additional replica or secondary replica is added or deleted based upon a particular threshold.

Figure 3:
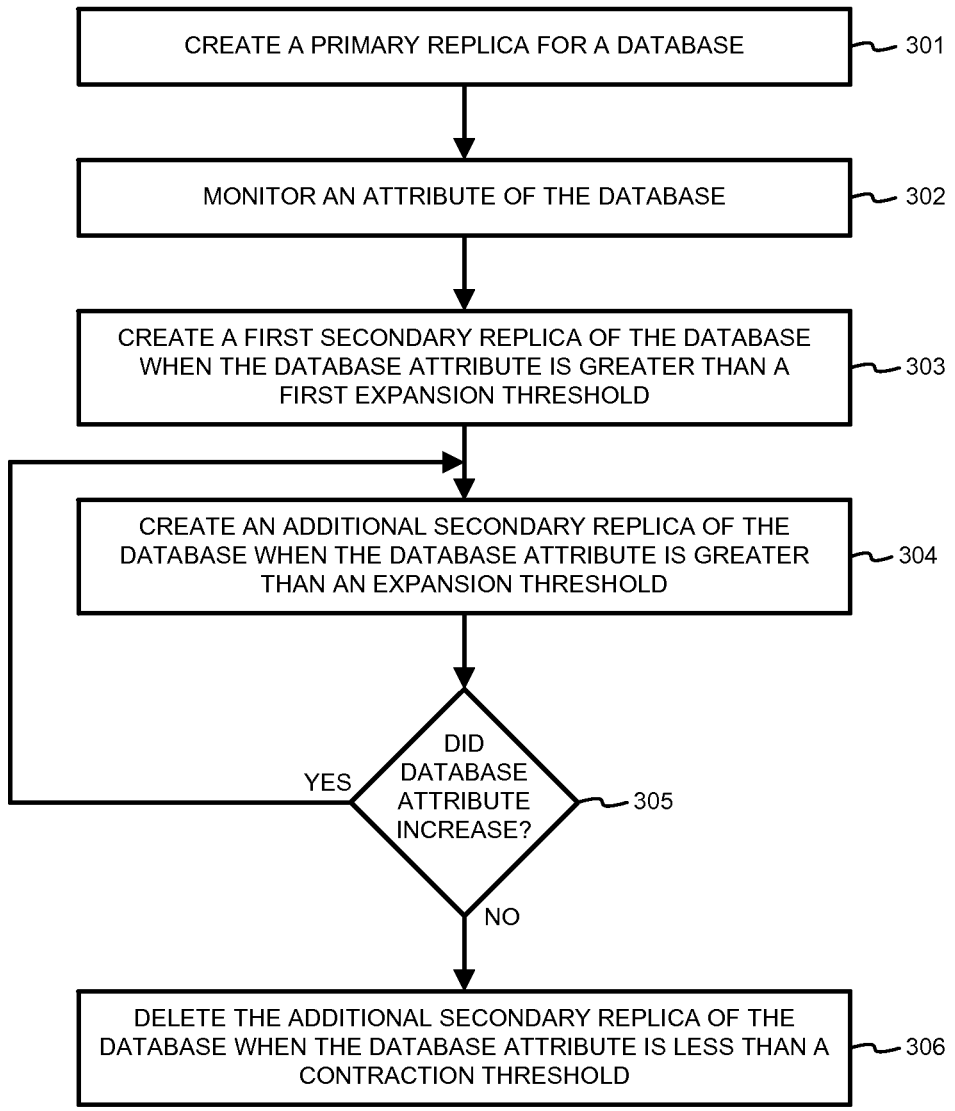
FIG. 3 is a flowchart illustrating a method or process for managing the number of replicas created for a database according to another embodiment.

FIG. 3 is a flowchart illustrating a method or process for managing the number of replicas created for a database according to another embodiment. In step 301, a primary replica is created for a database. In step 302, an attribute of the database is monitored. The attribute may be, for example, a size of the database, a number of database transactions, a frequency of database transactions, a type of database transactions, or any other database feature.

In step 303, a secondary replica of the database is created when the attribute is greater than a first expansion threshold. For example, when a database size increases beyond a first size, a first secondary replica may be created. In step 304, an additional secondary replica is created when the attribute is greater than an expansion threshold. The additional expansion threshold may be, for example, a second size. When the database grows beyond the second size, a second secondary replica is created.

In step 305, the database attribute continues to be monitored. If the attribute continues to increase, then the attribute is compared to additional expansion thresholds in step 304 and additional secondary replicas may be created. For example, when the database grows beyond the third size, a third secondary replica is created.

Hard and soft thresholds need to be stored for each incremental replica. In one embodiment, these thresholds maybe stored in a table lookup that maps the replica size to replica count.

In step 306, an additional secondary replica is deleted when the attribute is less than a contraction threshold. For example, when the database falls below a third contraction threshold, the third secondary replica is deleted.

In other embodiments, the attribute may be a number or frequency of database transactions. When the frequency of transactions passes a threshold, an additional replica may be created. This embodiment can be used to protect "hot" databases that have a high number of transactions. For example, if a replica fails, then it may be difficult to efficiently create a replacement replica if the transaction volume is very high. Accordingly, having an "extra" replica already in place for the high transaction database would allow the system to continue operating with minimal impact.

It will be understood that steps 201-205 of the process illustrated in FIG. 2 and steps 301-308 of the process illustrated in FIG. 3 may be executed simultaneously and/or sequentially. It will be further understood that each step may be performed in any order and may be performed once or repetitiously.

Figure 4:
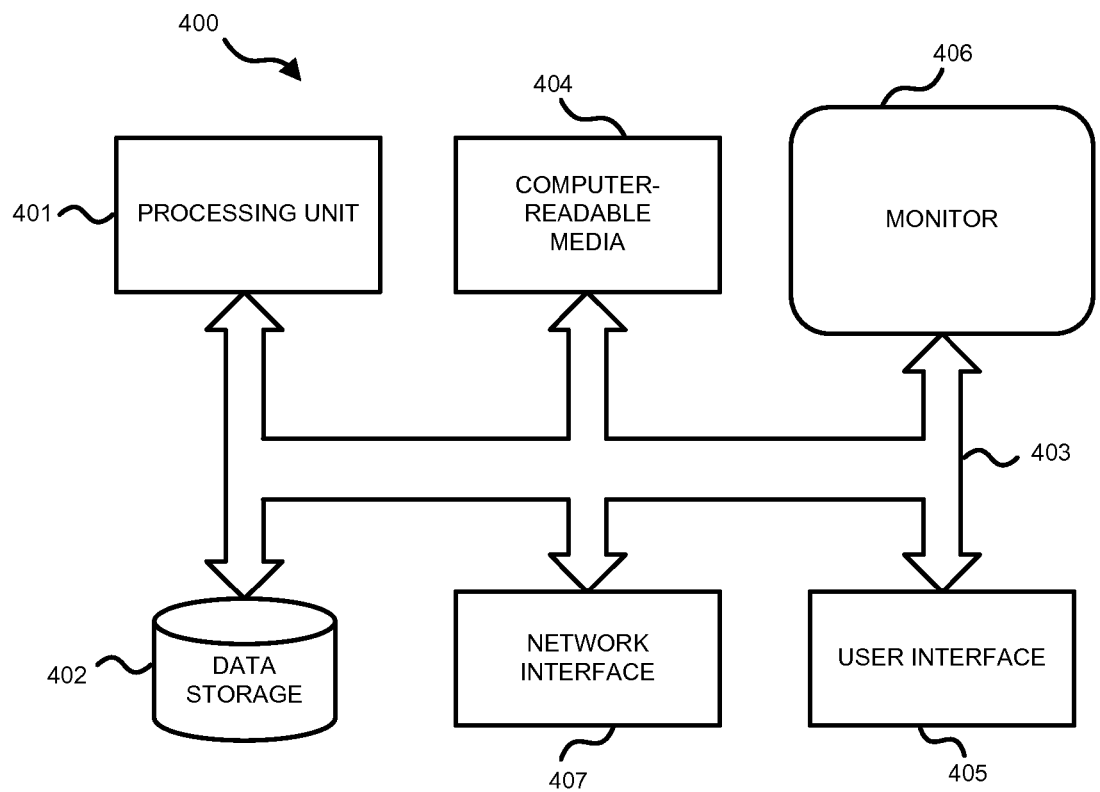
FIG. 4 illustrates an example of a suitable computing and networking environment for managing the number of database replicas.

FIG. 4 illustrates an example of a suitable computing and networking environment 400 on which the examples of FIGS. 1-3 may be implemented to manage the number of database replicas. The computing system environment 400 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 400. Components may include, but are not limited to, various hardware components, such as processing unit 401, data storage 402, such as a system memory, and system bus 403 that couples various system components including the data storage 402 to the processing unit 401. The system bus 403 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 typically includes a variety of computer-readable media 404. Computer-readable media 404 may be any available media that can be accessed by the computer 400 and includes both volatile and nonvolatile media, and removable and non-removable media, but excludes propagated signals. By way of example, and not limitation, computer-readable media 404 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 402 includes computer storage media in the form of volatile and/or nonvolatile memory such as read only memory (ROM) and random access memory (RAM). A basic input/output system (BIOS), containing the basic routines that help to transfer information between elements within computer 400, such as during start-up, is typically stored in ROM. RAM typically contains data and/or program modules that are immediately accessible to and/or presently being operated on by processing unit 401. By way of example, and not limitation, data storage 402 holds an operating system, application programs, and other program modules and program data.

Data storage 402 may also include other removable/non-removable, volatile/nonvolatile computer storage media. By way of example only, data storage 402 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 4, provide storage of computer-readable instructions, data structures, program modules and other data for the computer 400.

A user may enter commands and information through a user interface 405 or input device. The user input interface 405 may be coupled to the system bus 403, but may be connected by other interface and bus structures. A monitor 406 or other type of display device may also be connected to the system bus 403 via an interface, such as a video interface.

The computer 400 may operate in a networked or cloud-computing environment using logical connections 407 to one or more remote devices, such as a remote computer. The remote computer may be a personal computer, a server, a router, a network PC, a peer device or other common network node, and typically includes many or all of the elements described above relative to the computer 400. The logical connections depicted in FIG. 4 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 400 may be connected to a public or private network through a network interface or adapter 407. In some embodiments, a modem or other means for establishing communications over the network. The modem, which may be internal or external, may be connected to the system bus 403 via the network interface 407 or other appropriate mechanism. A wireless networking component such as comprising an interface and antenna may be coupled through a suitable device such as an access point or peer computer to a network. In a networked environment, program modules depicted relative to the computer 400, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   in the computer having a processor and a memory coupled to the processor, the memory having program instructions stored thereon that, upon execution by the processor, cause the computer to dynamically vary a number of replicas of a database to protect users from data loss by:
   creating, by a partition manager, at least three replicas for the database;
   monitoring, via a load balancer coupled to the partition manager, a size of the database with respect to a first threshold, wherein the first threshold corresponds to a user-defined size of the database above which a fourth replica of the database is created, and wherein the first threshold is independent of a maximum size of the database;
   creating, by the partition manager, the fourth replica for the database in response to a determination that the size of the database is greater than the first threshold;
   monitoring, by the load balancer, the size of the database with respect to a second threshold, wherein the second threshold indicates an another user-defined size of the database below which the fourth replica of the database is deleted, and wherein the second threshold is smaller than the first threshold; and
   deleting, by the partition manager, the fourth replica in response to a determination that the size of the database is smaller than the second threshold to prevent frequent cycling between the number of replicas.

2. The computer-implemented method of claim 1, further comprising:
   creating the replicas on separate machines.

3. The computer-implemented method of claim 1, wherein one of the replicas is designated as a primary replica and the other replicas are secondary replicas.

4. The computer-implemented method of claim 1, further comprising:
   maintaining a global partition map in the partition manager maintains to track replicas for a plurality of databases.

5. The computer-implemented method of claim 2, further comprising:
   maintaining a local partition map each machine to track the state of the replicas on a particular machine.

6. A memory device having program instructions stored thereon for dynamically varying a number of replicas of a database to protect users from data loss, wherein the program instructions, upon execution by a processor of a computer system, cause the computer system to:
   create a primary database replica and two initial secondary database replicas;
   monitor an attribute of the primary database replica, wherein the attribute is at least one attribute selected from the group consisting of: a frequency of database transactions, a number of database transactions, and a type of database transaction;
   create the at least one additional secondary database replica in response to a determination that the database attribute is greater than a first user-defined threshold;
   monitor, by a load balancer, the size of the database with respect to a second threshold, wherein the second threshold indicates a user-defined size of the database below which the at least one additional secondary database replica is deleted, and wherein the second threshold is smaller than the first threshold; and
   delete, by a partition manager, the at least one additional secondary database replica in response to a determination that the size of the database is smaller than the second threshold to prevent frequent cycling between the number of replicas.

7. The memory device of claim 6, wherein the attribute is a database size, and wherein the program instructions, upon execution by the processor, further cause the computer system to:
   create the two initial secondary database replicas after the primary database replica is created, the initial secondary database replicas created without respect to the size of the primary database replica.

8. The memory device of claim 6, wherein the program instructions, upon execution by the processor, further cause the computer system to:
   create the replicas on separate machines.

9. A computer system, comprising:
   one or more processors; and
   a memory having stored thereon computer-executable instructions for dynamically varying a number of replicas of a database to protect users from data loss, wherein the computer-executable instructions, upon execution by the one or more processors, cause the computer system to:
   create three replicas for the database;
   monitor a size of the database with respect to a first threshold, wherein the first threshold corresponds to a user-defined size of the database above which a fourth replica of the database is created, and wherein the first threshold is independent of a maximum size of the database;

create a fourth replica for the database in response to a determination that the size is greater than the first threshold;

monitor, by a load balancer, the size of the database with respect to a second threshold, wherein the second threshold indicates an another user-defined size of the database below which the fourth replica of the database is deleted, and wherein the second threshold is smaller than the first threshold; and delete, by the partition manager, the fourth replica in response to a determination that the size of the database is smaller than the second threshold to prevent frequent cycling between the number of replicas.

10. The computer system of claim 9, wherein the computer-executable instructions, upon execution by the one or more processors, further cause the computer system to:
create the replicas on separate machines.

11. The computer system of claim 9, wherein one of the replicas is designated as a primary replica and the other replicas are secondary replicas.

12. The computer system of claim 9, wherein a partition manager controls the creation and deletion of the fourth replica.

13. The computer system of claim 12, wherein a load balancer agent monitors the database and provides database size data to the partition manager.

\* \* \* \* \*